I. A. WEAVER.
DISPENSING APPLIANCE.
APPLICATION FILED APR. 7, 1917.
1,290,814.
Patented Jan. 7, 1919.
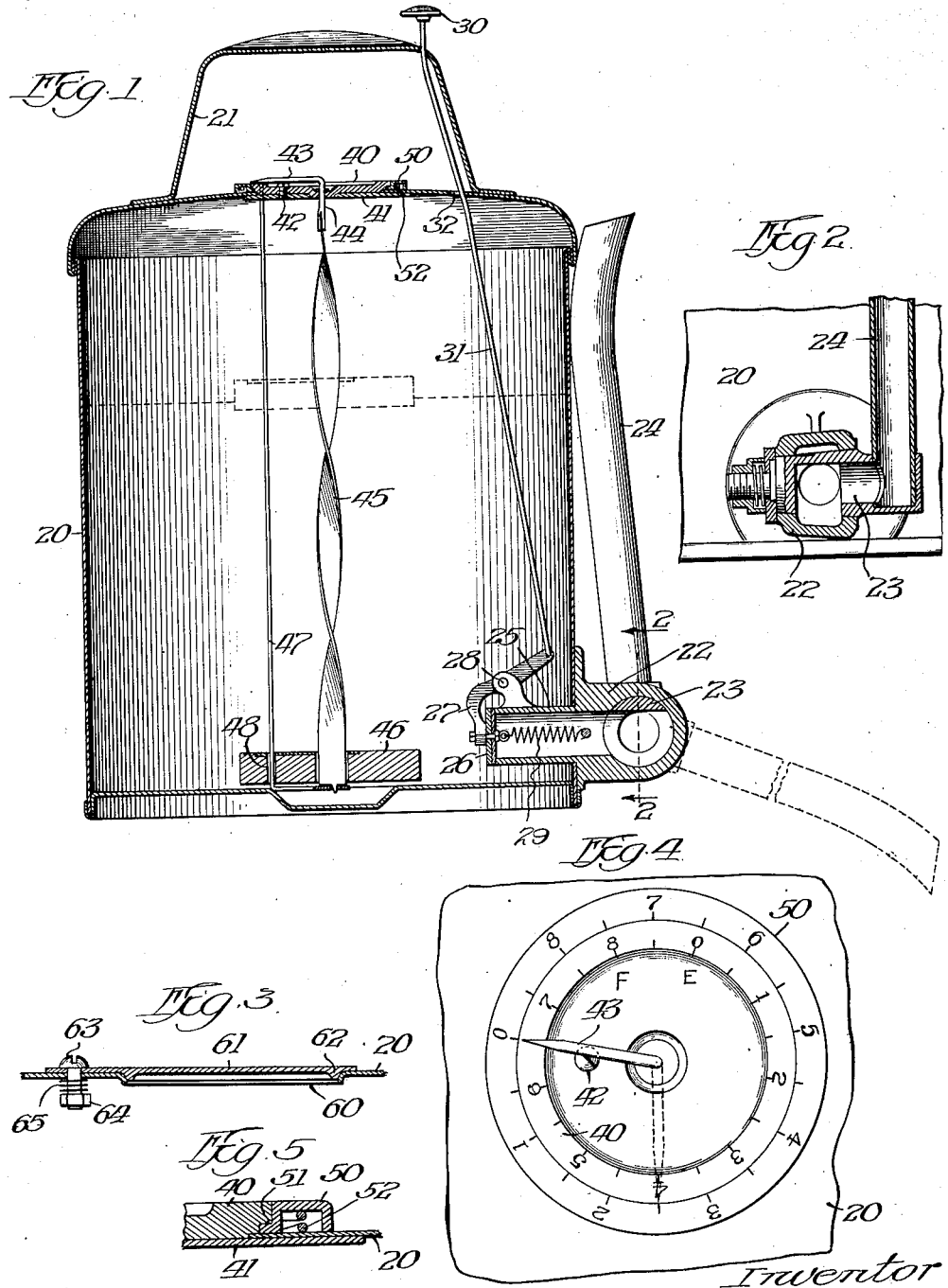

UNITED STATES PATENT OFFICE.

IRA A. WEAVER, OF SPRINGFIELD, ILLINOIS, ASSIGNOR TO THE WEAVER MANUFACTURING COMPANY, OF SPRINGFIELD, ILLINOIS, A CORPORATION OF ILLINOIS.

DISPENSING APPLIANCE.

1,290,814.  Specification of Letters Patent.  Patented Jan. 7, 1919.

Application filed April 7, 1917. Serial No. 160,349.

*To all whom it may concern:*

Be it known that I, IRA A. WEAVER, a citizen of the United States, residing at Springfield, in the county of Sangamon and State of Illinois, have invented certain new and useful Improvements in Dispensing Appliances, of which the following is a specification.

My invention aims to provide a dispensing appliance or vessel, such as a can for lubricating oils, although, of course, its employment for any particular purpose is not important, equipped with means which will disclose at all times the quantity of the can's contents and also provided with means enabling the operator to draw off any desired or definite quantity of the contents without calculation of any kind. The improved device, furthermore, enables the operator to deliver an unknown or indefinite quantity of the can's contents and then determine the exact amount so discharged and without any calculations.

To permit the accomplishment of such result, I provide this container with a double gage or scale, one portion of which at all times displays the total contents of the receptacle, the other part being adjustable for use in dispensing a limited quantity permitting a ready ascertainment of the amount sold.

In the preferred embodiment of the invention such gage has a revoluble pointer or needle actuated by a float within the container and by coöperation with a fixed, circular, graduated gage indicates at all times the total quantity of fluid in the can. Surrounding this fixed gage is another ring-gage similarly graduated and co-acting with the same needle or index, but capable of annular adjustment to determine the amount of liquid poured out or delivered to a customer.

Various other advantages of the improved construction will be appreciated by those skilled in this art from a consideration of the illustration and description of the preferred embodiment presented herewith, particularly the means for controlling the delivery through the discharge spout or nozzle and the improved means for closing the filling opening of the can.

In the drawing showing this improved device, like reference characters refer to the same parts throughout the various views.

In the drawing:

Figure 1 is a central vertical section through the appliance;

Fig. 2 is a fragmentary section through the spout connection with the can; on the line 2—2;

Fig. 3 is a fragmentary vertical section through the filling opening;

Fig. 4 is a plan of the duplex gage located beneath the handle, and

Fig. 5 is an enlarged fragmentary section through a portion of such gage.

By reference to the drawing, it will be understood that the appliance includes a can or container 20 equipped on its top with a handle 21 by which it may be carried and with which it may be manipulated. Near the bottom of the receptacle, on its outer face, I provide an apertured bearing-member 22 accommodating a perforated or hollow lateral journal portion 23 of a discharge spout or nozzle 24, which by reason of this mounting may be swung down into operative position, as shown in Fig. 1 in dotted lines, or swung up into inoperative position as indicated in full lines in the same figure. The member 22 has a tube portion 25 extended into the can through an aperture in its wall, the tube being equipped with a valve 26, adapted to open and close its inner end, mounted on an arm 27 fulcrumed on the tube at 28. The valve is normally closed by the action of a spring 29 secured thereto and to a cross-pin in the tube, and is opened by means of a thumb pressure on the head or button 30 of a rod 31 pivotally connected to the rock-arm 27 and extended upwardly through the top wall of the container at 32 and through an aperture in the handle, so that the thumb of the hand which grasps the handle may readily manipulate or operate the valve.

Beneath and protected by the handle and in full view of the operator, the container top wall is provided with a fixed or stationary circular scale or gage 40 graduated preferably in quarts and fractions thereof, the scale being fitted in an aperture of the top wall and held therein by an inner-plate 41 larger than the aperture and maintained against the under surface of the wall and held to the corresponding face of the scale by one or more screws 42, the threaded portions of which take into threaded holes of the two parts 40 and 41.

A rotary pointer or needle 43, which coacts with the scale or gage to indicate thereon the total contents of the can at all times, has a downturned part 44 extended through and having a bearing in the center of the gage and secured to the upper end of a revoluble twisted bar 45 projecting through an elongated slot in a cork-float 46 prevented from rotating by means of a fixed upright rod 47 passing through a hole 48 therein, the rod being secured fixedly to the top and bottom walls of the container. At its lower end the rod is bent laterally to provide a bearing for the bottom end of the twisted bar.

Encircling such stationary total gage, I provide an angularly-adjustable dispensing ring-gage 50 having the same number of graduations on its top face as the inner gage 40 but reversely arranged, the pointer or index coöperating with both gages. In order to prevent unintentional turning of this outer gage and to maintain it in proper association with the inner gage, the edge of the latter is undercut or provided with an annular groove 51 in which a similarly-shaped inwardly-projecting rib on the outer gage fits, thus bringing about a desirable interfitting of the parts. To provide sufficient friction, the underside of the outer ring gage is recessed for the reception of a coil-spring 52 which bears on the ring and on the top surface of the container.

The contents of the can may be replenished through a round hole 60 in its top-wall, the hole being ordinarily closed by a plate 61 having a circular rib 62 on its under side adapted to project into the hole to prevent undesired displacement of the closure. This plate is hinged to the can top by a bolt 63 between the nut 64 on the inner end of which and the underside of the can top wall a coil-spring 65 is interposed, and which acts to hold the plate down, yet permits its lifting to free its rim from the hole before the plate is swung sidewise to open the aperture.

The device is used practically as follows:

Assuming that the can contains 6½ quarts of lubricating oil, registered by the needle on the scale 40 as is shown in full lines in Fig. 4, and that a customer arrives who requires an unknown quantity of oil, say for example, for the crank case of an automobile engine, the operator turns the outer ring gage 50 so as to bring the zero thereof opposite the needle point. Then he turns down the spout to delivering position and while holding the container by means of the handle presses on the thumb piece 30, opening the valve and permitting a flow of the oil through the spout. Assuming that the customer's needs have been met and that 2½ quarts have been delivered, this quantity will now be registered by the pointer on the outer gage which at this time indicates 2½ quarts, (as shown in dotted lines, Fig. 4), and the remaining total quantity of the oil in the container will be registered by the same position of the pointer on the inner scale, which at this time will indicate four quarts. As soon as the desired quantity has been delivered, the operator releases his thumb from the button, the valve closes under the action of its spring, the discharge ceases, and the nozzle may be swung up so as not to drip. It will be seen from this construction and description of the operation of this appliance, that the operator is advised at all times of the quantity of oil in the container, and that without calculation of any kind, he can readily determine the amount that has been dispensed at any delivery by the mere preliminary or initial manipulation of the outer gage-member.

All this is accomplished without reliance upon the memory as to the original quantity started with in the can.

It will be observed that the handle by which the container is held or supported also has a sliding bearing for the valve-operating rod, that the button on the end of such rod may be depressed by a thumb or finger of the hand supporting the can by means of the handle, and that the latter by being positioned over the gage protects the latter from damage or injury.

While I have herein shown and described one desirable embodiment of the invention, it is to be understood that the latter is not limited and restricted to the precise and exact features of construction presented because these may be modified within comparatively wide limits without departure from the heart and substance of the invention and without the sacrifice of any of its substantial benefits and advantages.

I claim:

1. In a dispensing-appliance of the character described, the combination of a container, a float adapted to be acted on by the contents of said container, an index actuated by said float, a fixed graduated scale with which said index coöperates, and a reversely-graduated adjustable scale with which said index coöperates, substantially as described.

2. In a dispensing-appliance of the character described, the combination of a container, a float adapted to be acted on by the contents of said container, a rotary index operated by said float, a fixed circular graduated scale with which said index coöperates, and an angularly-adjustable reversely-graduated circular scale with which said index also coöperates, substantially as described.

3. In a dispensing-appliance of the character described, the combination of a container, a graduated scale, an index coöperating with said scale, means adapted at all times to cause said index to register the total contents of the container on said scale, and a second graduated scale on which said index is adapted to register individual withdrawals of the container's contents, said scales being relatively movable, substantially as described.

4. In a dispensing-appliance of the character described, the combination of a container, a graduated scale, an index coöperating with said scale, means adapted at all times to cause said index to register the total contents of the container on said scale, and a second reversely-graduated scale on which said index is adapted to register individual withdrawals of the container's contents, said scales being relatively movable, substantially as described.

5. In a dispensing-appliance of the character described, the combination of a container, means to register at all times the total contents of the container, and means to register the amounts of individual withdrawals of the container's contents, said two registering means having at least one part in common, substantially as described.

IRA A. WEAVER.

Witnesses:
F. M. ROGERSON,
BEN W. LAWLESS.